(12) United States Patent
Wang et al.

(10) Patent No.: US 6,691,110 B2
(45) Date of Patent: Feb. 10, 2004

(54) SYSTEM AND METHOD FOR DISCOVERING PATTERNS WITH NOISE

(75) Inventors: Wei Wang, White Plains, NY (US);
Jiong Yang, White Plains, NY (US);
Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 09/814,660

(22) Filed: Mar. 22, 2001

(65) Prior Publication Data

US 2002/0138480 A1 Sep. 26, 2002

(51) Int. Cl.$^7$ .............................................. G06F 17/30
(52) U.S. Cl. ........................................... 707/6; 702/19
(58) Field of Search ...................... 707/6, 7; 702/181, 702/19, 20; 704/240

(56) References Cited

U.S. PATENT DOCUMENTS

| | | | | |
|---|---|---|---|---|
| 5,129,002 A | | 7/1992 | Tsuboka ..................... 381/43 |
| 5,189,709 A | | 2/1993 | Wang et al. .................. 382/10 |
| 5,710,864 A | * | 1/1998 | Juang et al. ................ 704/238 |
| 5,794,198 A | | 8/1998 | Takahashi et al. .......... 704/256 |
| 5,809,499 A | * | 9/1998 | Wong et al. ..................... 707/6 |
| 5,832,108 A | * | 11/1998 | Fukita et al. ............... 382/159 |
| 5,920,839 A | | 7/1999 | Iso ............................. 704/256 |
| 6,108,666 A | * | 8/2000 | Floratos et al. ............. 707/104 |
| 6,278,799 B1 | * | 8/2001 | Hoffman ..................... 382/159 |
| 6,373,971 B1 | * | 4/2002 | Floratos et al. ............. 382/129 |
| 6,400,853 B1 | * | 6/2002 | Shiiyama .................... 382/305 |
| 6,401,043 B1 | * | 6/2002 | Stanton, Jr. et al. .......... 702/20 |
| 6,408,250 B1 | * | 6/2002 | Grate et al. .................. 702/30 |
| 6,466,874 B1 | * | 10/2002 | Eisenberg et al. ............ 702/19 |
| 2003/0036854 A1 | * | 2/2003 | Desjarlais .................... 702/19 |

OTHER PUBLICATIONS

Park et al "Mining association rules with adjustable accuracy", ACM 1997, pp. 151–160.*
Guha et al "CURE: an efficient clustering algorithm for large databases", ACM 1998, pp. 73–84.*
Agrawal et al., "Mining Association Rules Between Sets of Items In Large Databases," Proc. ACM SIGMOD Conf. on Management of Data. 207–216. 1993.

* cited by examiner

*Primary Examiner*—Uyen Le
(74) *Attorney, Agent, or Firm*—F. Chau & Associates, LLP

(57) ABSTRACT

A system and method for determining patterns in a data sequence constructs a compatibility matrix which provides a probability between an actual occurrence of an item and an observed occurrence of that or another item between each item in the data sequence. Candidate patterns are generated. The candidate patterns include items in the data sequence. The candidate patterns are checked against the data sequence to determine a match value based on the compatibility matrix, and significant matches are determined based on candidate patterns having the match value above a threshold.

24 Claims, 5 Drawing Sheets

| observe / true | d1 | d2 | d3 | d4 |
|---|---|---|---|---|
| d1 | 0.9 | 0.1 | 0 | 0 |
| d2 | 0.05 | 0.8 | 0.05 | 0.1 |
| d3 | 0.05 | 0 | 0.7 | 0.15 |
| d4 | 0 | 0.1 | 0.25 | 0.75 |

FIG. 1

SYSTEM AND METHOD FOR DISCOVERING PATTERNS WITH NOISE

BACKGROUND OF THE INVENTION

1. Field of the Invention

The present invention relates to discovering significant patterns in long sequences of items, and more particularly for a system and method for identifying significant patterns in sequences which include noise.

2. Description of the Related Art

With the large amounts of data being stored and used, discovering and understanding significant patterns in large data sets has become increasingly important. Significant pattern discovery has taken on greater importance in a plurality of new fields as well as new applications for existing technologies. Support (the number of occurrences) of a pattern has been proposed as the metric of significance in an article by R. Agrawal et al., "Mining association rules between sets of items in large databases." Proc. ACM SIGMOD Conf. on Management of Data, 207–216, 1993. As discussed in Agrawal et al., an input is a set of transactions, and each transaction includes a set of items. The significance of a set of items is determined by the number of transactions which contain this set of items.

Due to the presence of noise, a symbol may be misrepresented by some other symbols. This substitution may prevent an occurrence of a pattern from being recognized and, in turn, slashes the support of that pattern. As a result, a frequent pattern may be "concealed" by the noise. This phenomenon commonly exists in many applications.

For example, in bio-medical study, mutation of amino acids is a common phenomenon studied in the context of biology. Some mutations are proven to occur with a non-negligible probability under normal circumstances and incur little change to an organism's biological functions. For example, the amino acid N in the human body is likely to mutate to D with little impact on behavior. In this sense, the amino acids should not be considered as a-totally independent.

In the area of performance analysis, many system-monitoring applications involve collecting and analyzing attributes that take continuous numerical values. A common approach to process the data is to quantize the domain into categories. If the true value of an attribute is close to the boundary of the quantization, there is a fair chance that the observed value may fall into the adjacent bin and be represented by a different label. It would be desirable if such kind of distortion can be taken into account during a data mining process. In the area of consumer behavior, for example, in the supermarket, consumers frequently buy a slightly different product or brand from their original intent due to various reasons, such as, the desired product was out of stock or misplaced. Allowing obscurity in item matching may unveil the customer's real purchase intention.

This problem becomes critical when the pattern is substantially long because an occurrence of a long pattern is much more subject to distortion caused by noise. In general, the length of a gene expression can range up to a few hundreds of links, if amino acids are taken as the granularity of the analysis. Some clinical studies show that, the amino acids N, K, and V are relatively more likely to mutate to amino acids D, R, and I, respectively. The corresponding gene expressions after the mutation may differ from the standard one. It is more equitable to treat them as possible (degraded) occurrences of the standard expression than to consider them as totally independent gene expressions.

Therefore, a need exists for a system and method which discovers significant patterns while accounting for noise effects. A further need exists for a new measure that accounts for mutation or naturally occurring changes in data in discovering significant patterns.

SUMMARY OF THE INVENTION

A system and method for determining patterns in a data sequence constructs a compatibility matrix which provides a probability between an actual occurrence of an item and an observed occurrence of that or another item between each item in the data sequence. Candidate patterns are generated. The candidate patterns include items in the data sequence. The candidate patterns are checked against the data sequence to determine a match value based on the compatibility matrix, and significant matches are determined based on candidate patterns having the match value above a threshold.

In alternate systems and methods, the items may include symbols and a compatibility matrix may be constructed which includes constructing a matrix such that a match is determined between any two symbols in the data sequence. The compatibility matrix may include rows and columns and each entry in the compatibility matrix corresponds to a row and a column. The match value between two items may include a number between 0 and 1.

The candidate patterns may be checked against the data sequence to determine a match value based on the compatibility matrix. This may include, for a pattern p and a sequence s of symbols, determining an overall match value of p with respect to s by aggregating p with respect to each subsequence s' with 1 symbols in s. The determining of an overall match value of p with respect to s may include determining a match value between p and s' by taking a product of the match value between symbols at each position in the data sequence.

The probability between an actual occurrence of an item may determined by experiment or expert opinion. The items may include symbols and candidate patterns may be generated using a level-wise approach wherein at each level one additional symbol is added to a total number of symbols considered in a candidate pattern. The candidate patterns may include a significant pattern if all sub patterns of the candidate pattern satisfy the threshold. Significant matches may be determined based on candidate patterns having the match value above a threshold such that for each candidate pattern, a match value of that candidate pattern is verified against the input sequence to determine a set of patterns that satisfy the threshold.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 1 depicts an example of a compatibility matrix in accordance with the present invention;

DETAILED DESCRIPTION OF PREFERRED EMBODIMENTS

Figure 2:
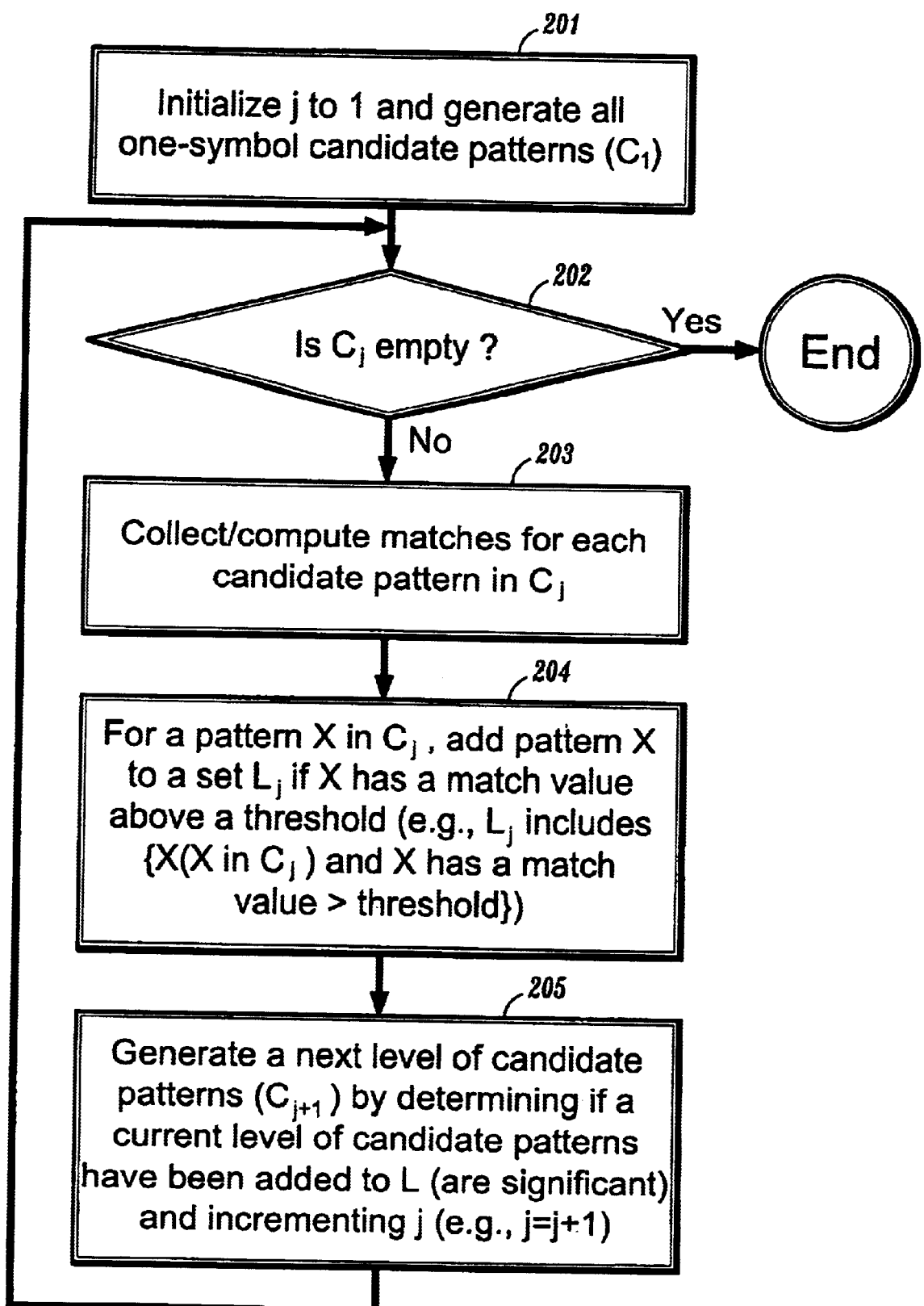
FIG. 2 is a block/flow diagram showing a system/method for discovering significant patterns according to a match model in accordance with the present invention.

The present invention provides a system and method for discovering significant patterns in a dates while accounting for noise effects. The present invention provides a new measure that accounts for mutation or naturally occurring changes in the data in discovering significant patterns. The present invention permits some flexibility in pattern matching. Prior art models for patterns, typically, take into account only exact matches of the pattern in data. The present invention provides a more flexible model that permits obscurity in pattern matching. A compatibility matrix is included to enable a clear representation of the likelihood of symbol substitution. Each entry in the matrix corresponds to a pair of symbols (x, y) and specifies the conditional probability that x is the true value given y is observed. The present invention also provides an efficient method to discover the patterns that satisfy a minimum match threshold.

It should be understood that the elements shown in FIGS. 1–5 may be implemented in various forms of hardware, software or combinations thereof. Preferably, these elements are implemented in software on one or more appropriately programmed general purpose digital computers having a processor and memory and input/output interfaces. The software is preferably implemented in programming code which may be incorporated in a software application.

Referring now to the drawings in which like numerals represent the same or similar elements and initially to FIG. 1, an illustrative example of a compatibility matrix 100 is shown in accordance with the present invention. The compatibility matrix 100 creates a natural bridge or link between an observation and underlying substance of the observation. Each observed symbol is then interpreted as an occurrence of a set of symbols with various probabilities. For example, an observed $d_1$ corresponds to a true occurrence of $d_1$, $d_2$, and $d_3$ with probability 0.9, 0.05, and 0.05, respectively. Similarly, an observed symbol combination is treated as an occurrence of a set of patterns with various degrees. A new metric, called "match" hereinafter is then proposed to quantify the significance of a pattern and is defined as an "accumulated amount of occurrences" of a pattern in the observed sequence.

For a sequential pattern $p=(p_1, p_2, \ldots, p_l)$, the match of p with respect to a sequence s of 1 symbols or items $(d_1, d_2, \ldots, d_l)$ is the probability that the s comes from p. Therefore, the match of p with respect to s is $C(p_1, d_1) \times C(p_2, d_2) \times \ldots \times C(p_l, d_l)$, where C(p, d) is the compatibility of d in pattern p. A "don't care" position in a pattern is marked by "*". It is clear that C(*, d)=1. For a sequence s with more than 1 symbols, for each 1 consecutive symbols s' in s, the match between p and s' is computed and the overall match between p and s is the sum of the match between p and all possible s'. For a pattern p and a sequence s of symbols, the overall match of p with respect to s is the aggregation of p with respect to each subsequence s' with 1 symbols in s. The match between p and s' is defined as the product of the match between symbols at each position.

The match of a pattern represents a "real support" that was expected if no noise is present. The compatibility matrix can be obtained through empiric tests. For example, for the mutation of amino acids, an expert may use clinical tests to determine the probability of mutation between two amino acids. In other examples, marketing tests may be employed to determine a preferred selection by brand name or product type, or expert opinion may be employed to estimate probabilities, etc.

As shown in FIG. 1, compatibility matrix 100 includes entries 101. Each entry in the matrix represents a conditional probability P(true value|observed value). For example, if a symbol d1 is observed, then with 0.9 probability, the true value is d1. On the other hand, with 0.05 probability, the true value may be d2. Matrix 100 illustratively shows probabilities for four items or symbols $d_1$, $d_2$, $d_3$ and $d_4$; however, matrix 100 many include any number of items.

Referring to FIG. 2, a system/method for mining sequential patterns is shown in accordance with one embodiment of the present invention. The mining is performed for sequential patterns with 1 positions, which satisfy a minimum match threshold. In block 201, the set of candidate patterns (C) including one (1) symbol (denoted as $C_1$) are generated, the remaining 1–1 positions are filled by "*" which indicates a "don't care" position. This is explained in greater detail with reference to FIG. 3. A counter j is initialized to 1. In block 202, a check is made to determine if $C_j$ is empty. If $C_j$ is not empty, a match value of the patterns in the candidate set $C_j$ is found in block 203. In block 204, a pattern $X_j$ whose match satisfies a minimum match threshold, is added into the set $L_j$. Based on $L_j$, a new set ($C_{j+1}$) of candidate patterns are generated in block 205. $C_{j+1}$ includes patterns with j+1 non-"*" symbols. The process continues until $C_{j+1}$ (or $C_j$ in the first iteration) is empty as determined in block 202.

FIG. 2 may be explained by a simple example. A data set or input sequence has a long sequence of symbols (say a hundred for example). It is desirable to determine significant patterns in the input sequence. In this example, patterns may include one, two, three or four symbols (e.g., 1=4). Also in this example, the set of possible symbols includes a, b, c and d. In block 201, $C_1$ generates candidate patterns with one symbol, e.g., all 1-patterns of $C_1$ include (a, *, *, *), (b, *, *, *), (c, *, *, *) and (d, *, *, *) Since $C_j$ ($C_0$ is this case) is non-empty (there is at least one 1-pattern), processing continues in block 203. In block 203, a match value is collected for each candidate pattern. The match value quantifies the significance of a pattern and is defined as an "accumulated amount of occurrences" of a pattern in the observed sequence. A pattern is a candidate if all its sub-patterns satisfy a minimum match threshold. For each candidate pattern, an exact match of that pattern is verified against the input sequence and the set of patterns that satisfy the minimum match threshold are determined.

For a sequential pattern $p=(p_1, p_2, \ldots, P_l)$ of 1 symbols in the input sequence of the data set (e.g., 1 consecutive symbols taken 1 at a time), the match of p with respect to a sequence s (one symbol in the first iteration in this example) of 1 symbols (1=4) is the probability that the s comes from p. Therefore, the match of p with respect to s is C $(p_1, d_1) \times C(p_2, d_2) \times \ldots \times C(p_l, d_l)$, where $C(p_i, d_i)$ is the compatibility of $d_i$ in pattern $p_i$, for i=1, 2, . . . , 1. In the example, $d_1$=a, $d_2$=b, $d_3$=c and $d_4$=d. A "don't care" position in a pattern is marked by "*". For a sequence s with more than 1 symbols, for each 1 consecutive symbols s' in s, the match between p and s' is computed and the overall match between p and s is the sum of the match between p and all possible s' (See FIG. 3). Probabilities from the compatibility table (see. e.g., FIG. 1) are combined into the match value to provide flexibility, as described above.

Once match values are determined, candidate patterns $C_j$ with a match value above a threshold are determined to be significant patterns, as denoted by X, and are added to $L_j$ which stores significant patterns in block 204. In the example, (a, *, *, *), (b, *, *, *) are significant since the match value is above a match threshold. A set of significant patterns X=(a, *, *, *), (b, *, *, *) are added to $L_j$.

Then, a new set of candidate patterns are generated in block 205. This is performed by first checking if the "lower" patterns are all in L. This is demonstrated for the example above when j=3. If lower patterns: (a, b, *, *), (a, *, c, *), and (a, b, *, *) are significant, i.e., in L, then (a, b, c, *) (the higher pattern) is a candidate pattern and is inserted into $C_3$. Thus, $C_3$ is not empty. When the method loops back to block 202, $C_3$ is not empty and the method therefore continues. If however, one of the three patterns (a, b, *, *), (a, *, c, *), and (a, b, *, *) is not significant, i.e., missing from L, then (a, b, c, *) is not a candidate and is not inserted into $C_3$. Furthermore, if $C_3$ is empty, the method terminates.

In this way, a more flexible analysis of patterns in an input sequences is provided in accordance with the present invention. The results of FIG. 2 provide as an output, set L, which includes all the significant patterns in the data set (input sequence). L advantageously provides not only exact match sequences but sequences with high probability of being matched but for some reason, e.g., due to noise, circumstances, mutations, etc. are not exact match sequences.

Figure 3:
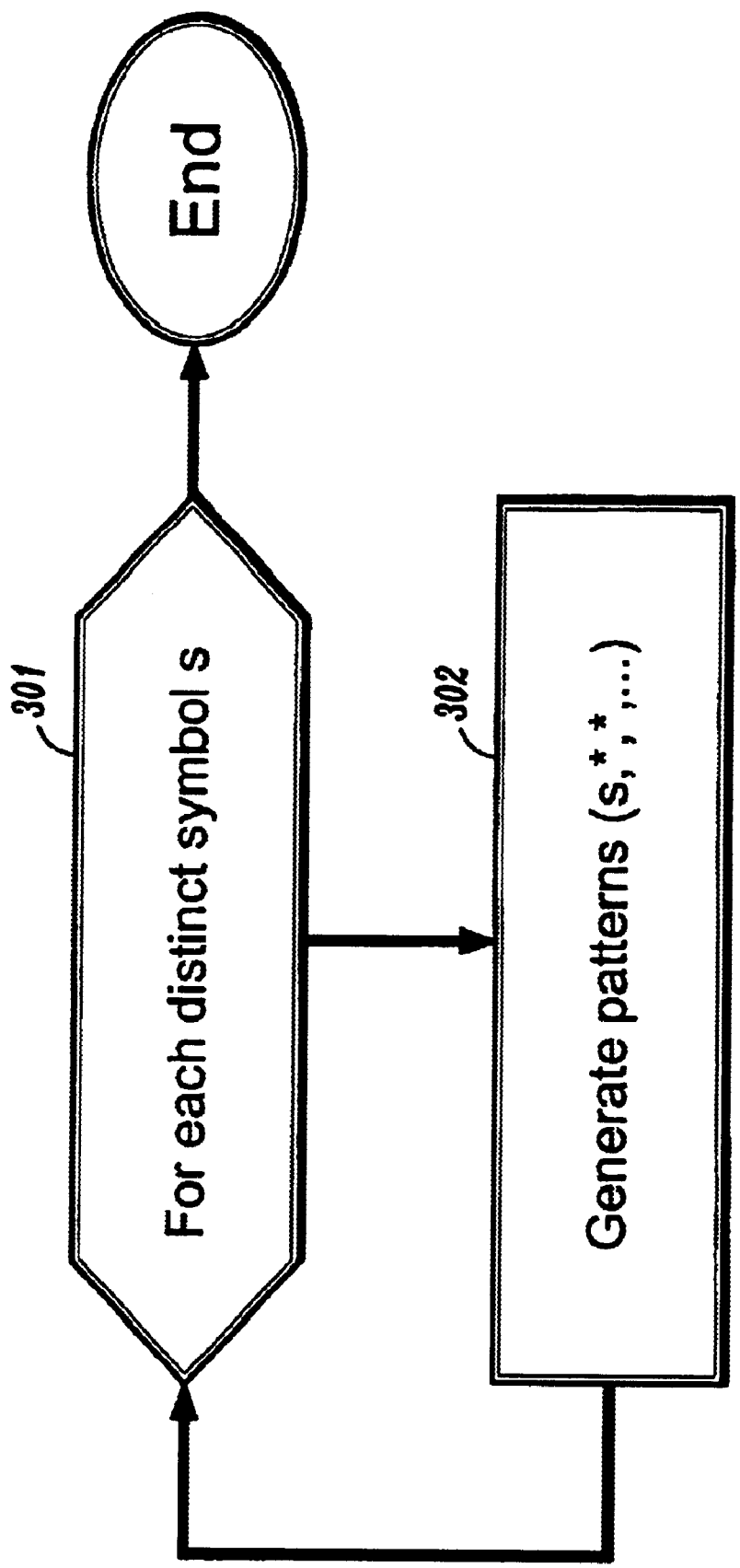
FIG. 3 is a block/flow diagram showing a system/method for finding one-candidate patterns for block 201 of FIG. 2 in accordance with the present invention.

Referring to FIG. 3, generating one candidate patterns in block 201 of FIG. 2 is described in greater detail. In block 301, for each distinct symbol s in an input sequence (from the data set), a pattern is generated with 1 positions in block 302. For this iteration all positions are "*" except the first position which is s. In the next and future iterations, the candidate patterns C are generated based on significant match values. Block 201 is an initialization step to begin the search for significant patterns.

Figure 4:
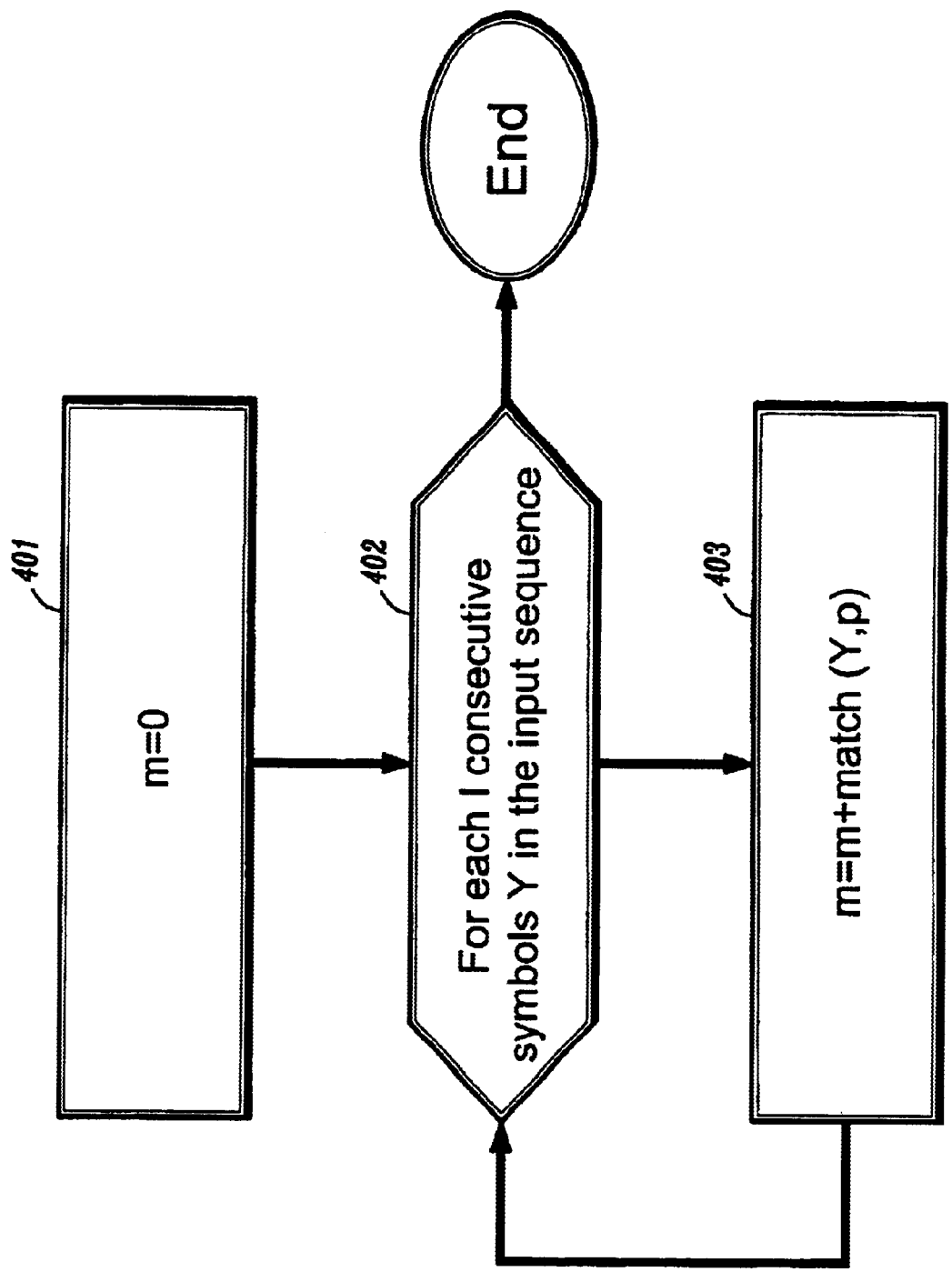
FIG. 4 is a block/flow diagram showing a system/method for collecting matches for each candidate pattern for block 203 in FIG. 2 in accordance with the present invention.

Referring to FIG. 4, collecting a match value for each candidate pattern C is performed in accordance with block 203 of FIG. 2. In block 401, variable m is set to be 0. In block 402, for each 1 consecutive symbols in the input sequence called a window Y, the variable m is incremented by the match between the 1 symbols and p in the input sequence in block 403. In one example, if the candidate pattern includes two symbols and two "*", the window Y moves along an input sequence 1 symbols at a time and performs a match comparison between the symbols in the window and the symbols in the pattern p.

Figure 5:
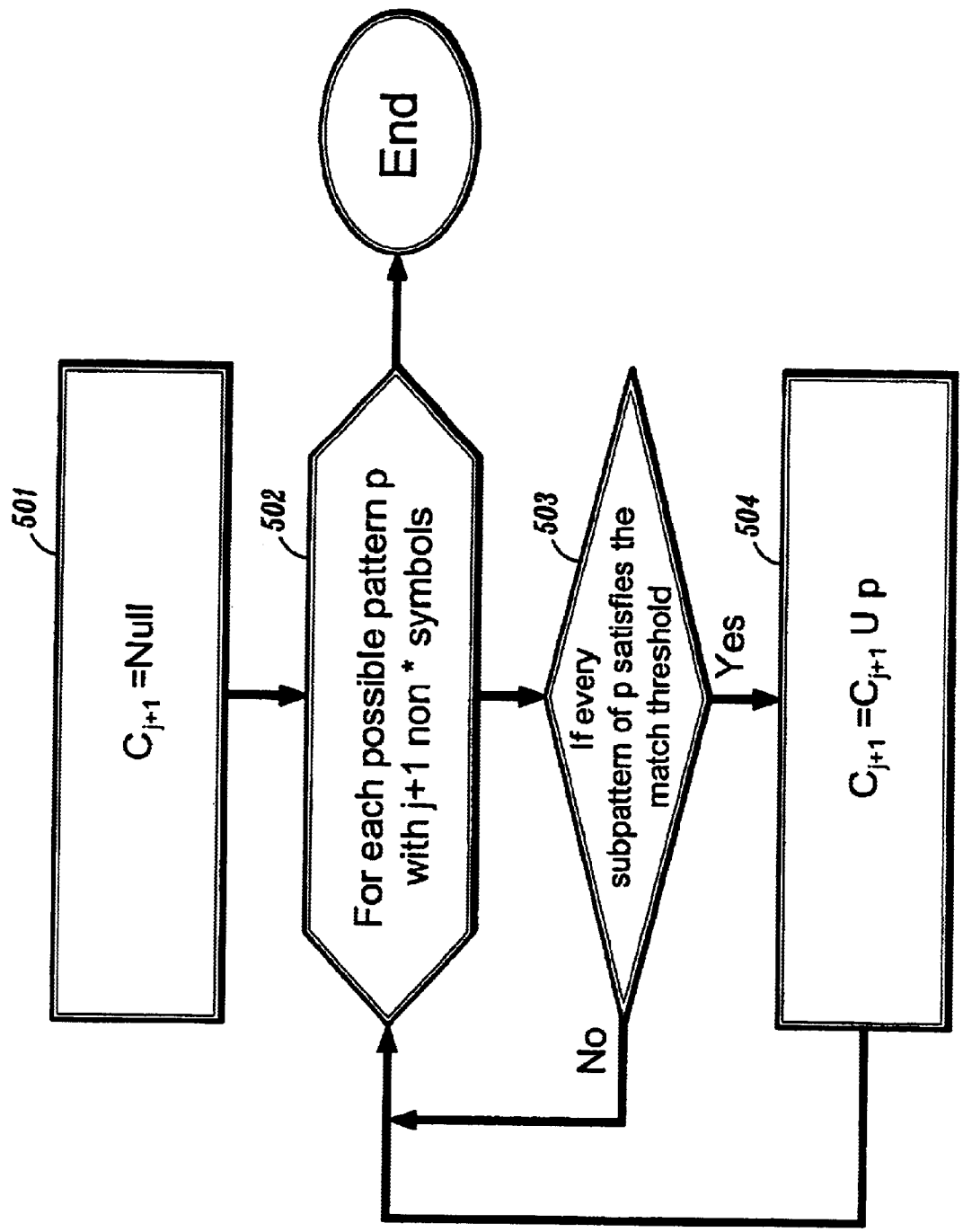
FIG. 5 is a block/flow diagram showing a system/method for generating next level candidate patterns for block 205 in FIG. 2 in accordance with the present invention.

Referring to FIG. 5, generating a new candidate pattern set $C_{j+1}$ in block 205 of FIG. 2 is described in greater detail. In block 501, $C_{j+1}$ is initialized to a null set. $C_{j+1}$ will potentially be the newly generated candidate patterns for j+1 non-"*" symbols. For each possible pattern p with j+1 non-"*" symbols (block 502), if all subpatterns of p satisfy the minimum match threshold (block 503), i.e., are in L, then p is inserted into $C_{j+1}$ in block 504. $p'=(p'_1, p'_2, \ldots, p'_l)$ is a subpattern of $p=(p_1, p_2, \ldots, p_l)$ if and only if for each position i, $p'_i=p_i$ or $p_i=*$.

Pattern discovery in a large data set, in accordance with the present invention, is useful in many applications including, for example, computational biology study, consumer behavior analysis, system performance analysis, etc. In a noisy environment, the observed sequence may not accurately reflect the underlying behavior. For example, the amino acid N in human body is likely to mutate to D with little impact to the biological function of the protein. The occurrence of D in the observation can be related to a possible mutation from N in an appropriate manner. The compatibility matrix of the present invention provides a probabilistic connection from the observation to the underlying true value. A new metric match is also provided to capture the "real support" of a pattern which would be expected if a noise-free environment is assumed.

Having described preferred embodiments of a system and method for discovering patterns with noise (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for determining patterns in a data sequence, comprising the steps of:

constructing a compatibility matrix which provides a probability between an actual occurrence of an item and an observed occurrence of that or another item between each item in the data sequence;

generating candidate patterns, the candidate patterns including items in the data sequence;

checking the candidate patterns against the data sequence to determine a match value based on the compatibility matrix; and determining significant matches based on candidate patterns having the match value above a threshold.

2. The method as recited in claim 1, wherein the items include symbols and the step of constructing a compatibility matrix includes constructing a matrix such that a match is determined between any two symbols in the data sequence.

3. The method as recited in claim 1, wherein the compatibility matrix includes rows and columns and each entry in the compatibility matrix corresponds to a row and a column.

4. The method as recited in claim 1, wherein the match value between two items includes a number between 0 and 1.

5. The method as recited in claim 1, wherein the step of checking the candidate patterns against the data sequence to determine a match value based on the compatibility matrix includes for a pattern p and a sequence s of symbols, determining an overall match value of p with respect to s by aggregating p with respect to each subsequence s' with 1 symbols in s.

6. The method as recited in claim 5, wherein the step of determining an overall match value of p with respect to s includes determining a match value between p and s' by taking a product of the match value between symbols at each position in the data sequence.

7. The method as recited in claim 1, wherein the probability between an actual occurrence of an item is determined by one of experiment and expert opinion.

8. The method as recited in claim 1, wherein the items include symbols and the step of generating candidate patterns includes the step of generating candidate patterns using a level-wise approach wherein at each level one additional symbol is added to a total number of symbols considered in a candidate pattern.

9. The method as recited in claim 8, wherein the candidate patterns include a significant pattern if all subpatterns of the candidate pattern satisfy the threshold.

10. The method as recited in claim 8, wherein the step of determining significant matches based on candidate patterns having the match value above a threshold includes the step of: for each candidate pattern, verifying a match value of that candidate pattern against the input sequence to determine a set of patterns that satisfy the threshold.

11. A program storage device readable by machine, tangibly embodying a program of instructions executable by the machine to perform method steps for determining patterns in a data sequence, the method steps comprising:

constructing a compatibility matrix which provides a probability between an actual occurrence of an item and an observed occurrence of that or another item between each item in the data sequence;

generating candidate patterns, the candidate patterns including items in the data sequence;

checking the candidate patterns against the data sequence to determine a match value based on the compatibility matrix; and determining significant matches based on candidate patterns having the match value above a threshold.

12. The program storage device as recited in claim 11, wherein the items include symbols and the step of constructing a compatibility matrix includes constructing a matrix such that a match is determined between any two symbols in the data sequence.

13. The program storage device as recited in claim 11, wherein the compatibility matrix includes rows and columns and each entry in the compatibility matrix corresponds to a row and a column.

14. The program storage device as recited in claim 11, wherein the match value between two items includes a number between 0 and 1.

15. The program storage device as recited in claim 11, wherein the step of checking the candidate patterns against the data sequence to determine a match value based on the compatibility matrix includes for a pattern p and a sequence s of symbols, determining an overall match value of p with respect to s by aggregating p with respect to each subsequence s' with 1 symbols in s.

16. The program storage device as recited in claim 15, wherein the step of determining an overall match value of p with respect to s includes determining a match value between p and s' is by taking a product of the match value between symbols at each position in the data sequence.

17. The program storage device as recited in claim 11, wherein the probability between an actual occurrence of an item is determined by one of experiment and expert opinion.

18. The program storage device as recited in claim 11, wherein the items includes symbols and the step of generating candidate patterns includes the step of generating candidate patterns using a level-wise approach wherein at each level one additional symbol is added to a total number of symbols considered in a candidate pattern.

19. The program storage device as recited in claim 18, wherein the candidate patterns include a significant pattern if all subpatterns of the candidate pattern satisfy the threshold.

20. The program storage device as recited in claim 18, wherein the step of determining significant matches based on candidate patterns having the match value above a threshold includes the step of: for each candidate pattern, verifying a match value of that candidate pattern against the input sequence to determine a set of patterns that satisfy the threshold.

21. A system for determining patterns in a data sequence, comprising the steps of:

a compatibility matrix including a plurality of entries, each entry including a probability between an actual occurrence of an item and an observed occurrence of that or another item between each item in the data sequence; and a processor including a program which generates candidate patterns which include items in the data sequence and checks the candidate patterns against the data sequence to determine a match value based on the compatibility matrix, the program determining significant matches based on candidate patterns having the match value above a threshold.

22. The system as recited in claim 21, wherein the entries include a match value between any two symbols in the data sequence.

23. The system as recited in claim 21, wherein the items include symbols and the candidate patterns include a levelwise patterns wherein at each level one additional symbol is added to a total number of symbols considered in a candidate pattern.

24. The system as recited in claim 23, wherein the candidate patterns include a significant pattern if all subpatterns of the candidate pattern satisfy the threshold.

* * * * *